(12) United States Patent
Scriffignano et al.

(10) Patent No.: US 7,584,188 B2
(45) Date of Patent: Sep. 1, 2009

(54) SYSTEM AND METHOD FOR SEARCHING AND MATCHING DATA HAVING IDEOGRAMMATIC CONTENT

(75) Inventors: Anthony Scriffignano, West Caldwell, NJ (US); Kevin Nedd, Long Valley, NJ (US); Peihsin Shao, Taipei (TW); Simpeng Gan, Shangai (SG); Sarah Lu, Shangai (CN); Masayuki Okada, Tokyo (JP); Mayako Kasai, Tokyo (JP); Julian N. N. Prower, Oxone (GB); Nicholas Teoh, Kuala Lumpur (MY); Jeremy Sy, Glen Waverley (AU); Warwick Matthews, Victoria (AU)

(73) Assignee: Dun and Bradstreet, Short Hills, NJ (US)

( * ) Notice: Subject to any disclaimer, the term of this patent is extended or adjusted under 35 U.S.C. 154(b) by 284 days.

(21) Appl. No.: 11/603,413

(22) Filed: Nov. 22, 2006

(65) Prior Publication Data

US 2007/0162445 A1    Jul. 12, 2007

Related U.S. Application Data

(60) Provisional application No. 60/739,270, filed on Nov. 23, 2005.

(51) Int. Cl.
*G06F 7/00*      (2006.01)
(52) U.S. Cl. ............... 707/6; 707/3; 707/4; 707/10; 704/8
(58) Field of Classification Search .............. 707/3, 707/4, 6, 10; 704/8
See application file for complete search history.

(56) References Cited

U.S. PATENT DOCUMENTS 5,175,803 A * 12/1992 Yeh ........................ 715/234

(Continued)

FOREIGN PATENT DOCUMENTS

EP        1139264        10/2001

(Continued)

OTHER PUBLICATIONS

"Balancing up Efficiency and Accuracy in Translation retrieval"—Timothy Baldwin & Hozumi Tanaka—Journal of Natural Language Processing, vol. 8, No. 2, Apr. 2001 (pp. 19-37).*

(Continued)

*Primary Examiner*—Shahid A Alam
*Assistant Examiner*—Anh Ly
(74) *Attorney, Agent, or Firm*—Ohlandt, Greeley, Ruggiero & Perle, L.L.P.

(57) ABSTRACT

A method of searching and matching non-phonetic or ideogrammatic input data to stored data, including the steps of receiving input data comprising a search string having a plurality of elements, converting a subset of the elements into a set of terms, generating an optimized plurality of keys from the set of terms, retrieving stored data based on the optimized keys corresponding to most likely candidates for match, and selecting a best match from the plurality of candidates. At least some of the ideogrammatic elements form part of an ideogrammatic writing system. The method may also include dividing the search string into a plurality of overlapping sub-segments and identifying sub-segments having inferred semantic meaning as well as sub-segments having no semantic meaning in the ideogrammatic writing system, and using the various sub-segments to generate the optimized keys.

16 Claims, 27 Drawing Sheets

Example: (Cost by key is representative, algorithms are representative of the full range of available retrieval methods)

U.S. PATENT DOCUMENTS

| | | | | |
|---|---|---|---|---|
| 5,337,233 | A * | 8/1994 | Hofert et al. | 715/234 |
| 5,594,642 | A * | 1/1997 | Collins et al. | 715/236 |
| 5,659,731 | A * | 8/1997 | Gustafson | 707/4 |
| 5,664,027 | A * | 9/1997 | Ittner | 382/170 |
| 5,818,291 | A * | 10/1998 | Tiede et al. | 327/538 |
| 5,960,430 | A * | 9/1999 | Haimowitz et al. | 707/6 |
| 6,026,398 | A * | 2/2000 | Brown et al. | 707/5 |
| 6,311,152 | B1 * | 10/2001 | Bai et al. | 704/9 |
| 6,311,178 | B1 * | 10/2001 | Bi et al. | 707/3 |
| 6,643,640 | B1 * | 11/2003 | Getchius et al. | 707/3 |
| 6,817,018 | B1 * | 11/2004 | Clarke et al. | 719/313 |
| 6,848,080 | B1 * | 1/2005 | Lee et al. | 715/203 |
| 6,963,871 | B1 * | 11/2005 | Hermansen et al. | 707/6 |
| 7,392,240 | B2 * | 6/2008 | Scriffignano et al. | 707/3 |
| 7,395,203 | B2 * | 7/2008 | Wu et al. | 704/235 |
| 2001/0007987 | A1 * | 7/2001 | Igata | 707/3 |
| 2002/0010589 | A1 * | 1/2002 | Nashida et al. | 704/275 |
| 2002/0124015 | A1 | 9/2002 | Cardno et al. | 707/204 |
| 2002/0169763 | A1 * | 11/2002 | Tada et al. | 707/3 |
| 2003/0061211 | A1 | 3/2003 | Shultz et al. | 707/3 |
| 2003/0212563 | A1 * | 11/2003 | Ju et al. | 704/277 |
| 2003/0225725 | A1 * | 12/2003 | Miller et al. | 707/1 |
| 2004/0019593 | A1 | 1/2004 | Borthwick et al. | 707/4 |
| 2004/0036716 | A1 * | 2/2004 | Jordahl | 345/713 |
| 2004/0088657 | A1 * | 5/2004 | Brown et al. | 715/542 |
| 2004/0158562 | A1 * | 8/2004 | Caulfield et al. | 707/5 |
| 2004/0162742 | A1 * | 8/2004 | Stoker et al. | 705/7 |
| 2004/0164951 | A1 * | 8/2004 | Lun Pun et al. | 345/156 |
| 2004/0220918 | A1 | 11/2004 | Scriffignano et al. | |
| 2005/0273468 | A1 * | 12/2005 | Hermansen et al. | 707/100 |
| 2006/0074991 | A1 | 4/2006 | Lussier et al. | 707/200 |
| 2006/0106769 | A1 * | 5/2006 | Gibbs | 707/3 |
| 2006/0190256 | A1 * | 8/2006 | Stephanick et al. | 704/252 |
| 2006/0229865 | A1 * | 10/2006 | Carlgren et al. | 704/8 |
| 2007/0005567 | A1 * | 1/2007 | Hermansen et al. | 707/3 |
| 2007/0162445 | A1 * | 7/2007 | Scriffignano et al. | 707/6 |

FOREIGN PATENT DOCUMENTS

| | | |
|---|---|---|
| WO | 00/57258 | 9/2000 |
| WO | 01/35301 | 5/2001 |
| WO | 01/61605 | 8/2001 |
| WO | 01/73623 | 10/2001 |
| WO | 01/90909 | 11/2001 |

OTHER PUBLICATIONS

"Tangut Verbal Agreement and the Patient Category in Tibeto-Burman"—George van Driem—Bulletin of the school of Oriented and African Studies, University of London, vol. 54, No. 3 1991 (pp. 520-534) (URL:http://www.jstor.org/stable/619060).*

Chaundhuri, S. "An Overview of Query Optimization in Relational Systems," Microsoft Research, Redmond Washington, Jan. 6, 1998, pp. 34-43.

Horrell, S. "Microsoft Message Queue (MSMQ)", Enterprise Middleware, Jun. 1999, pp. 25-35.

Mitschang, B. "Anfragebearbeitung in Datenbanksystemen: Entwurfs- und Implementierungskonzepte", pp. 51-70, 1995 (XP002246553).

Stevens, WR "Interprocess Communication", Jan. 23, 1990, pp. 87-170.

* cited by examiner

Figure 5

CORRELATING JAPAN ADDRESS COMPONENTS TO PRIOR MATCHGRADE STRUCTURE

| Field Name | Bus Name | Street # | Street Name | City | Province/Prefecture | PO Box | Tel | Postal Code | Density | Unique | Industry |
|---|---|---|---|---|---|---|---|---|---|---|---|
| Possible Values | A,B,F | A,B,F,Z | A,B,F,Z | A,B,F,Z | A,B,F,Z | TBD | A,B,F,Z | A,B,F,Z | A,B,F,Z | A,B,F,Z | A,B,F,Z |
| # values | 3 | 4 | 4 | 4 | 4 | 1 | 4 | 4 | 4 | 4 | 4 |

Figure 7

| Matchgrade_Pattern | Confidence_Code | MGB01_Name | MGB02_StreetNum | MGB03_StreetName | MGB04_City | MGB04_Province/Prefecture | MGB06_MailAddr | MGB07_Tel | MGB08_Postal Code | MGB09_Density | MGB10_Uniqueness | MGB11_Industry | Version | Update_date |
|---|---|---|---|---|---|---|---|---|---|---|---|---|---|---|
| AAAAAZAAZZZ | 9 | A | A | A | A | A | N | A | A | N | N | N | 1.0 | 21/01/2005 09:28 |
| AAAAAZABZZZ | 7 | A | A | A | A | A | N | A | B | N | N | N | 0.5 | 1/01/2005 13:02 |
| AAAAAZAFZZZ | 7 | A | A | A | A | A | N | A | F | N | N | N | 0.5 | 1/01/2005 13:02 |
| AAAAAZAZZZZ | 7 | A | A | A | A | A | N | A | N | N | N | N | 0.5 | 1/01/2005 13:02 |
| AAAAAZBAZZZ | 7 | A | A | A | A | A | N | B | A | N | N | N | 0.5 | 1/01/2005 13:02 |

Figure 10

HINGLES

邓白氏国际信息咨询（上海）有限公司

邓白氏国际

邓白

白氏

氏国

国际

Hanzee shingles (a.k.a. "hingles")

Note: Hingles are shown with a size of two and an offset of one for illustration purposes. Other hingle widths and offsets have different implications for semantic retention, predictiveness as a retrieval method, and computational complexity to derive.

Figure 11

STICKY HINGLES

邓白氏国际信息咨询（上海） 有限公司

上 "up, above" + 海 "sea" = 上海 "Shanghai"

Allowing certain Hanzee characters to "stick" accounts for the need to retain meaning in the semantic aggregations.

Figure 12

DUMB HINGLES

Base String:

邓白氏国际信息咨询（上海）有限公司

Broken into "words":

邓白氏 国际 信息咨询 上海 有限公司
      信息咨询 上海
      信息咨询 all "Noisy" = low value

But if you look at Hingles that join "noisy" words.......

询上 · Much less common
询上 · Very predictive!

Figure 13

Structural Indicators within names

"D&B Taiwan"

美商鄧白氏股份有限公司

American  Dun & Bradstreet   Taiwanese Corporate Structure
business    (Pinyin)                    (Company limited by shares)

Abbreviations

D&B (above) is abbreviated as..

Divisions / Departments within the name.

宏基电子    Acer Electronics

宏基电机    Acer Machinery

宏基资讯    Acer Information Systems

Figure 15

HACRONYMS

"Hacronyms". (Hanzee Acronyms)

联华电子     "United Electronics"
  \ /
  联电        "U.E."

Figure 16

TREATING SIMILARITIES ACROSS TRADITIONAL AND SIMPLIFIED SCRIPT

Traditional & Simplified Script

Generally:

| Traditional | Simplified |
|---|---|
| Taiwan<br>Hong Kong | China |

But it is not always so clear-cut...

*English:* D&B International Consultant (Shanghai) Co., Ltd

*100% Simplified:* 邓白氏国际信息咨询（上海）有限公司
Simplified — Same in Both — Simplified

*Mixed:* 鄧白氏國際信息咨詢（上海）有限公司
Traditional — Simplified

Figure 17

EXAMPLES OF COMPUTING ALGORITHMIC CONSTANTS FOR RETRIEVAL OPTIMIZATION

| A(n) Algorithm | CC Computational Complexity | P Predictiveness | AC Algorithmic Constant |
|---|---|---|---|
| A1 | 4 | 1/4 | 1.00 |
| A2 | 9 | 1/3 | 3.00 |
| A3 | 2 | 1/12 | 0.17 |

| A(n) Algorithm | AC Algorithmic Constant | Y Expected Yield | X Score |
|---|---|---|---|
| A1 | 1.00 | 800 | 800.00 |
| A2 | 3.00 | 50 | 150.00 |
| A3 | 0.17 | 100 | 16.67 |

Figure 19

MATCH QUALITY FEEDBACK ATTRIBUTE – LEVEL EVALUATION

| Business Name | Street Name | | Province/ Prefecture | | Telephone | Density | Industry |
|---|---|---|---|---|---|---|---|
| A | A | B | A | Z | B | F | A | Z | B |

Street #   City   Secondary Address   Postal Code   Uniqueness

Figure 20

EXAMPLES OF ATTRIBUTE LEVEL EVALUATIONS

| A | Same | 三菱商事（株） vs. 三菱商事 | Mitsubishi Trading Corp. vs. Mitsubishi Trading |
| --- | --- | --- | --- |
| B | Similar | 三菱商事（株） vs. 三菱自動車工業（株） | Mitsubishi Trading Corp. vs. Mitsubishi Motors Corp |
| F | Different | 三菱商事（株） vs. 三井物産（株） | Mitsubishi Trading Corp. vs. Mitsui Corp |
| Z | Null | | One or Both are Null (Blank) |

STRATIFICATION OF ATTRIBUTE – LEVEL FEEDBACK

Sample non-editible report with Chinese data and English substrate

Figure 23
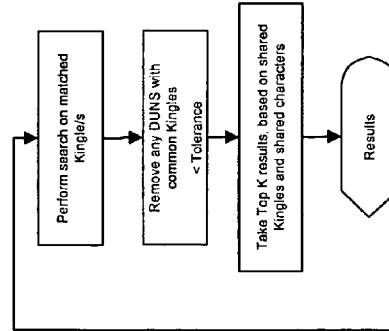
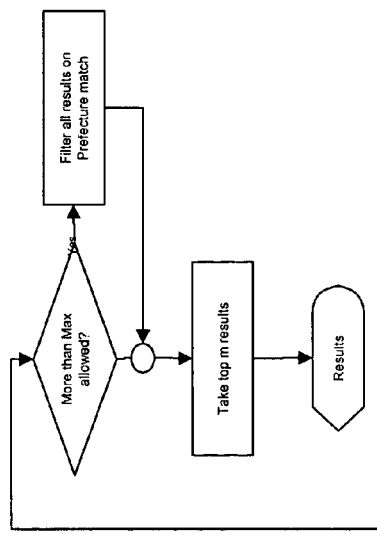
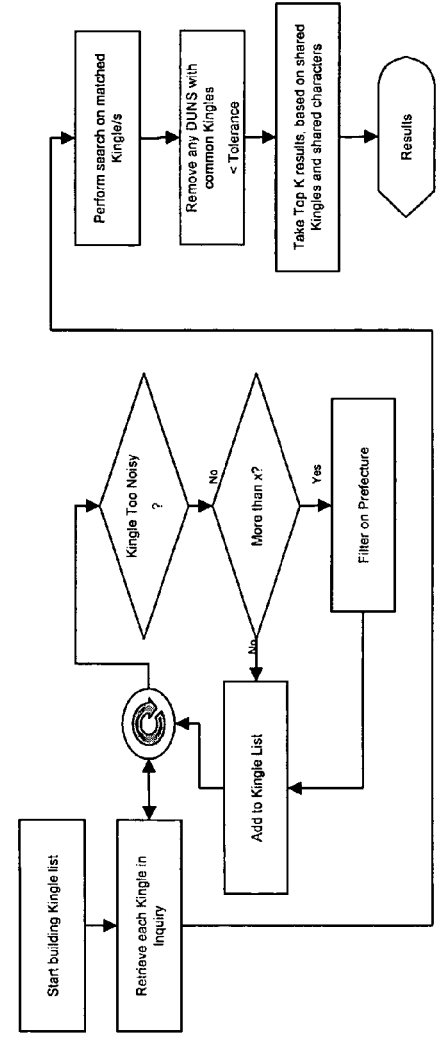
Full Text Indexing
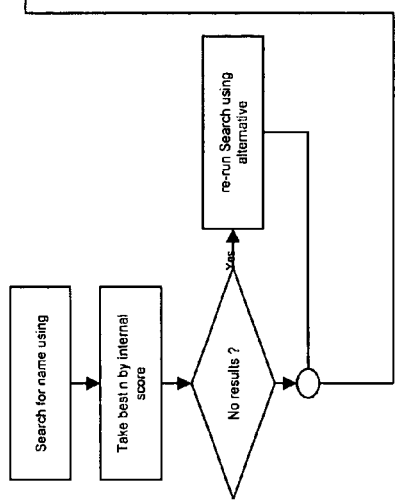
Name Kingling

Figure 24

Sample MatchGrade Algorithm UNIQUENESS

Uniqueness tells us how unique a company name is within its geographical context.

We score a candidate's uniqueness compared to an inquiry, based on a match between City and/or Province/Prefecture (or whatever geo units we use).

We consciously select the smallest available geo common to both inquiry and candidate.

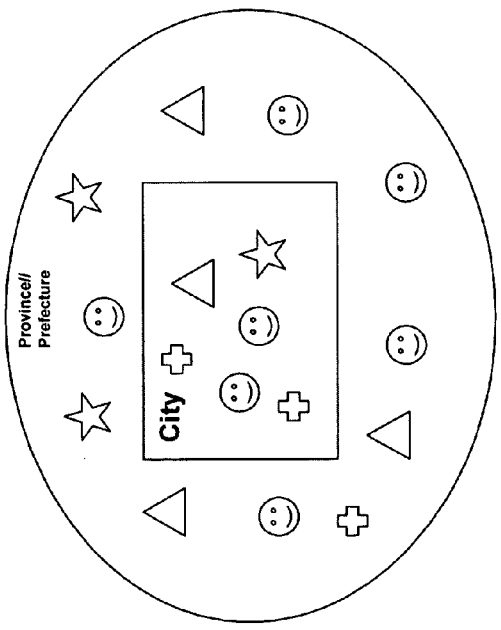

| Size of Geo | # of Businesses | Value of Being Unique |
|---|---|---|
| Small Geo | Few | Low |
| Large Geo | Many | High |

Assumptions:

1) The smaller area is always a subset of the larger one (eg city/state city/prefecture, province/country)
2) The size of the area is the count of businesses in that area (ie the number of entities in our reference file for that area)
3) Uniqueness is calculated according to an algorithm which is tuned to provide results mappable to A/B/F/Z

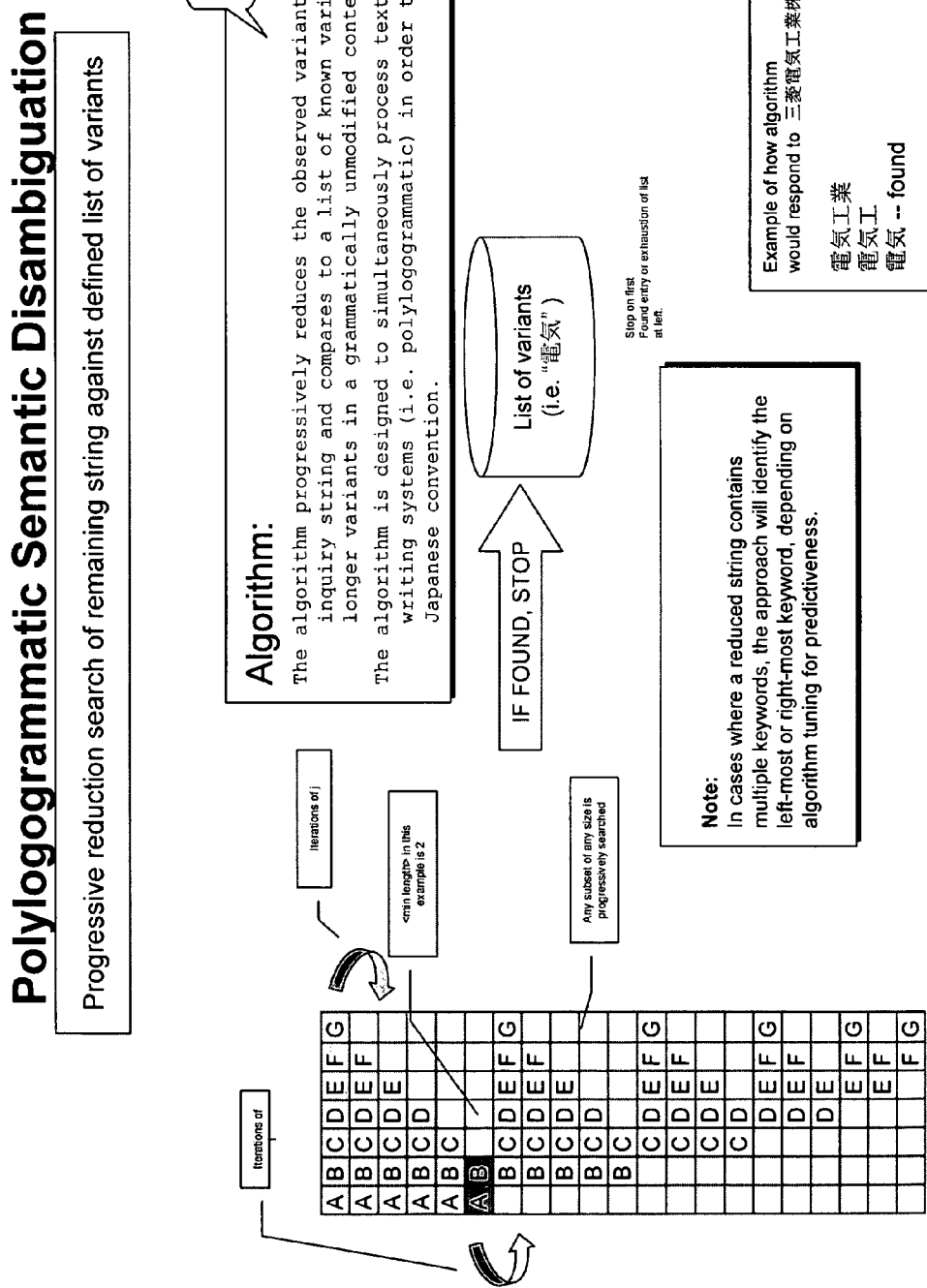

Figure 27

REPRESENTATIVE INDUSTRY SCORING

| Scenario | MG Code |
|---|---|
| Right-most or left-most, Longest (ie most specific) Keyword generated matches reference candidate's keyword (see Figure 26 for rationale) | A |
| Other (shorter) keyword matches reference candidate's keyword | B |
| No keyword generated for inquiry matches candidate's keyword | F |
| No keyword generated in either inquiry or candidate. | Z |

| | | | |
|---|---|---|---|
| Ref | 三井電気通信工業<br>MITSUI DENKI TSUUSHIN KOUGYOU<br>Mitsui Electric Communications Industry | Keyword | 電気, 通信 ⇒<br>通信<br>Communications |
| Inquiry | 三井情報通信<br>MITSUI JOUHOU TSUUSHIN<br>Mitsui Information Communications | Keywords | 情報通信<br>通信 = A<br>情報 |

SYSTEM AND METHOD FOR SEARCHING AND MATCHING DATA HAVING IDEOGRAMMATIC CONTENT

CROSS REFERENCE TO RELATED APPLICATION

This application claims priority to U.S. Provisional Application No. 60/739,270 filed on Nov. 23, 2005, which is hereby incorporated by reference in its entirety.

BACKGROUND

1. Field

The present disclosure relates to searching and matching data, and more particularly, to searching and matching data containing non-phonetic, semantic, or ideogrammatic content.

2. Description of the Related Art

Efficient database access and searching capabilities are important for effective utilization of data in databases. Crucial to this objective is the ability to enable efficient retrieval of the correct data sought by means operating to find a match without having to search through each data element stored in the reference universe.

Searching and matching systems are known, and provide useful ways to retrieve relevant information from a database for a variety of uses. For example, in the credit industry, credit history information on a given business entity being considered for credit is typically processed through a commercially available database. A user may input the name of a business entity into a processor connected to the database, which then locates that given entity in the database and retrieves its credit history information. Other examples include applications where a user may wish to integrate information from among disparate sources to get a common view of a customer or supplier.

An exemplary method and system for searching and matching input data with stored data is disclosed in U.S. patent application Ser. No. 10/702,114, published as U.S. Patent Application Publication No. 2004/0220918 A1, which is incorporated herein in its entirety by reference. The basic approach includes three sequentially performed processes, which are shown in FIG. 1:

1. Cleansing, Parsing and Standardization. This process includes a) identification of key components of inquiry data; b) normalization of name, address and city data; and c) standardization of address data.

2. Candidate retrieval. This includes a) selecting keys based on data provided in inquiry, b) optimizing keys to improve retrieval quality and speed, and c) gathering best possible match candidates from a reference database.

3. Evaluation and Decisioning. This step involves evaluating matches according to consistent standards utilizing consistent, reproducible match quality feedback to translate otherwise subjective decisions into objective criteria such as matchgrade patterns to reflect individual attribute decisioning and a confidence code for overall stratification of results into groupings of similar quality among other benefits. These treatments enable autodecisioning.

Prior Asian match feedback information was limited to strata in which match inquiry results are categorized as A, B or C. This level of feedback, without the ability to differentiate between results within the A or B level matches, at the individual level, is less than ideal since the number of matches within each category, particularly those in a B category, would be significant and there would be no way to differentiate among them without manual intervention by a native language speaker.

Resolving A, B and C matches is possible, but costly in that it is a very manual-intensive process, requiring human interaction to verify matches.

The matched categories were described as follows. An "A" match indicates a high likelihood of a match, but could contain matches to duplicates or false matches. A "B" match indicates a possible match, but one that would require manual study to resolve. A "C" match indicates a probable mismatch, which may also be due to deficiencies in inquiry data.

The issue with autodecisioning in the above-mentioned environment is a lack of granularity. Absent further feedback on the quality of the matches, a user had no way to choose among the many "B" matches in order to select the best matches. Even among the A matches, there is no ability to improve confidence short of manually reviewing each match.

A diagram of the prior art matching system is shown in FIG. 2.

In the present system, to further differentiate among inquiry results having different levels of matching, the high level match feedback is made more granular and mapped to a corresponding confidence code. Target confidence codes ("CC") are preferably chosen at the conservative end of the range. Subsequent tuning enhances the distribution of this mapping. An example of this mapping is shown in FIG. 3.

At a confidence code of 7 or above, many customers in marketing will set a system to auto-decision due to the ability to accept these matches without human intervention. Not all confidence code 7 matches will be perfect matches, so it is preferable to consider the autodecisioning threshold carefully. Conversely, many good matches would be ignored if confidence codes of lower than 7 are used. 7 is therefore the conservative end of the quality threshold, particularly for matches in complex languages such as Japanese.

A confidence between 5 and 7 indicates that there are still available "good" matches, especially where input data is sparse. Results having this confidence code range often require careful inspection to confirm, in the example of Japanese characters, due to the inherent complexity of the native language and multiple writing systems used. Some false matches may also exist due to duplication.

A confidence code of 4 is usually the lowest confidence code that many processes will even consider displaying. These matches are "unlikely" to be correct matches, and generally shouldn't be used unless the inquiry data is very sparse or other mitigating circumstances can be cited.

However, as the above examples show, although a set of data such as the identification and contact information of a business matches closely enough to be considered a "7 or above" confidence code match, that does not mean that the matched data is completely accurate. Likewise, "5 to 6" confidence code matches do not all have the same level of matching. Accuracy is a term best described for a unique business application.

Matchgrade patterns demonstrate different levels of individual attribute matching. An "A" symbol in the matchgrade results indicates a high confidence match in that data attribute between the customer information and the matched record. A "B" indicates similarity, but not to the level of similarity indicated by "A." An "F" symbol indicates that both the customer data and the matched record have different data for a given attribute. A "Z" indicates that either the customer information and/or the database record do not include any information for a given field. Evaluations are based not only on a character-by-character comparison, but also on semantic meaning, tone, lexemic variation, and other factors. Furthermore, these assignments are made not at the inquiry level overall, but on an individual attribute level to increase granularity and enable autodecisioning.

A confidence code may then be assigned to each different matchgrade string to allow stratification of results. Each of the component processes described above are further broken down into functional areas as shown in FIG. 4.

Using enhanced feedback, a user may enable business rules such as one that subdivides "5-6" confidence code matches, accepting those with perfect name and city, for example, and ordering lookup on those with the correct prefecture (municipality or province) but missing city, and disregarding those with a low quality match on the name. As a result, the feedback enables automated decisioning.

Additional challenges are posed to matching in databases where the process can not rely upon distinctions provided by writing systems that contain phonetic alphabets, such as English, French, and Greek. In languages such as Chinese and Japanese, writing systems embody semantic meaning and are constructed from ideograms, which present a unique challenge to searching and matching. Additionally, countries using these writing systems often freely integrate other writing systems that are phonetic to allow for the presentation of foreign words or new words. The challenge for evaluation in ideogrammatic writing systems is the semantic nature of the writing. Traditional methods for scoring based solely on orthography would be sorely inadequate to discern meaning at a level sufficient to differentiate "similar" from "same", which is at the heart of the inventive matchgrade processes.

Thus, there is a need to improve on existing search and match systems and methods, particularly by providing additional criteria for evaluating the quality of a match result in non-phonetic writing systems. There is also a need for a system and method for differentiating among machine matches without costly human intervention in data which is presented wholly or partially in an ideogrammatic context; thereby allowing for consistency and scalability. There is also a need for a system and method for fully-automated searching and matching that deals with the challenges of non-phonetic, ideogrammatic writing systems.

SUMMARY

The present disclosure provides a system and method for searching, matching, and providing quality feedback for data matching, i.e., enhanced Asian language (e.g., double-byte) match feedback.

The present disclosure also provides a computerized method of searching and matching input data to stored data. The method includes the steps of receiving input data comprising a search string having a plurality of elements, converting a subset of the plurality of elements to a set of terms, generating an optimized plurality of keys from the set of terms, retrieving stored data based on the optimized keys corresponding to most likely candidates for match to the input data, and selecting a best match from the plurality of match candidates. At least some of the elements form part of an ideogrammatic writing system. The step of converting a subset of the elements to a set of terms uses at least one method selected from the group consisting of polylogogrammatic semantic disambiguation, hanzee acronym expansion, kanji acronym expansion, and business word recognition.

There is also provided an enhanced Asian language match feedback system that includes measures of match quality between an inquiry record and a stored reference record. This system was made to mirror prior art for non-ideogrammatic writing systems using methods customized to the unique aspects of Asian writing systems. A matchgrade pattern or string, corresponding to numerous match values of data subsets within a database record, is mapped to an existing structure, i.e., the data contained in the inquiry data record, and reflects the individual quality of a name, certain address components, telephone number, and other information. A confidence code, for example designated by integers between 1 and 10, is provided that correspond to the matchgrade pattern, and reflects conservative match quality by stratifying matchgrade patterns into ranges to enable the application of business rules. The method also includes matching inquiry records and reference records stored in non-phonetic or ideogrammatic languages.

BRIEF DESCRIPTION OF THE DRAWINGS

FIG. 5 is a table showing mapping of a matchgrade pattern in a reference record of a Japanese business.

FIG. 7 is a table representing a matchgrade pattern matrix

FIG. 10 is an illustration of examples of Hanzee shingles ("shingles") derived according to the method of the present disclosure.

FIG. 11 is an illustration of examples of "sticky hingles" derived according to the method of the present disclosure.

FIG. 12 is an illustration of examples of "dumb hingles" derived according to the method of the present disclosure.

FIG. 13 is an illustration of an example of removing or abbreviating structural indicators according to the method of the present disclosure.

FIG. 14 is an illustration of an example of additional structural indicators contained as part of a business name.

FIG. 15 is an illustration of an example of a "Hacronym".

FIG. 16 is an example of simplified and traditional script.

FIG. 17 shows tables representing calculations of predictive scores for algorithms, according to the present disclosure.

FIG. 19 is an illustration of a matchgrade pattern.

FIG. 20 is a table showing matchgrade codes assigned to reference names, according to the method of the present disclosure.

FIG. 23 is a flow chart showing examples of full text indexing and name kingling, according to the method of the present disclosure.

FIG. 24 is an example of a matchgrade algorithm for uniqueness, according to the method of the present disclosure.

FIG. 26 illustrates an example algorithm for polylogogrammatic semantic disambiguation according to the method of the present disclosure.

FIG. 27 illustrates a representation of industry scoring, according to the method of the present disclosure.

DETAILED DESCRIPTION OF THE PREFERRED EMBODIMENT

The system and method of the present disclosure includes 1) cleansing, parsing and standardization, 2) candidate retrieval, and 3) evaluation and decisioning. Evaluation and decisioning involves evaluating matches according to consistent standards, and includes creating a matchgrade pattern to establish granular feedback, assigning a confidence code that enables autodecisioning, and including a Match Data Profile for extra information. All processes are enhanced to operate with the challenges presented by ideogrammatic writing systems.

The enhanced Asian language match feedback system and method includes three measures of match quality: 1) a matchgrade score, i.e., matchgrade, is mapped to an existing data structure, and reflects the individual quality of a name, certain address components, telephone number, and other information. 2) a confidence code, for example designated by numbers such as 3, 5 and 7, to enable stratification of results; and 3) a match data profile is also provided such that it contains additional information on the specific metadata used to achieve the result and further differentiates match results, particularly "5-6" confidence code match results.

Furthermore, available (or derivable) information can be mapped in solution for more robust communication that resembles the current feedback in other parts of the world. An example of this mapping in a Japan match solution is shown in FIG. 5.

Figure 1:
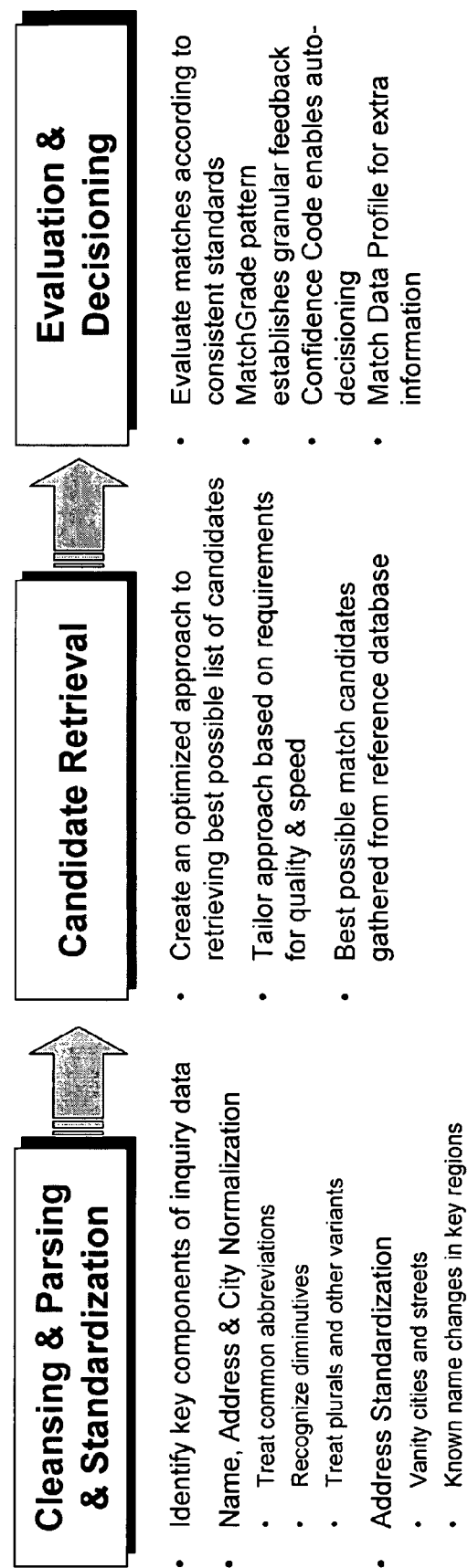
FIG. 1 is a block diagram of a prior art record matching method.
Figure 2:
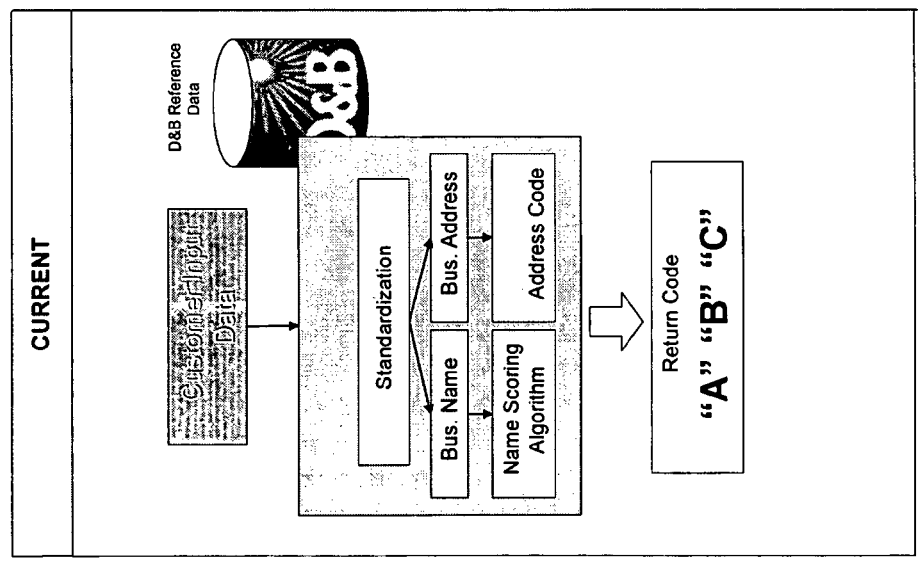
FIG. 2 is a block diagram of a prior art record matching system.
Figure 3:
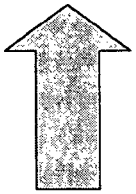
FIG. 3 is a table showing the mapping of confidence codes to matching results.
Figure 4:
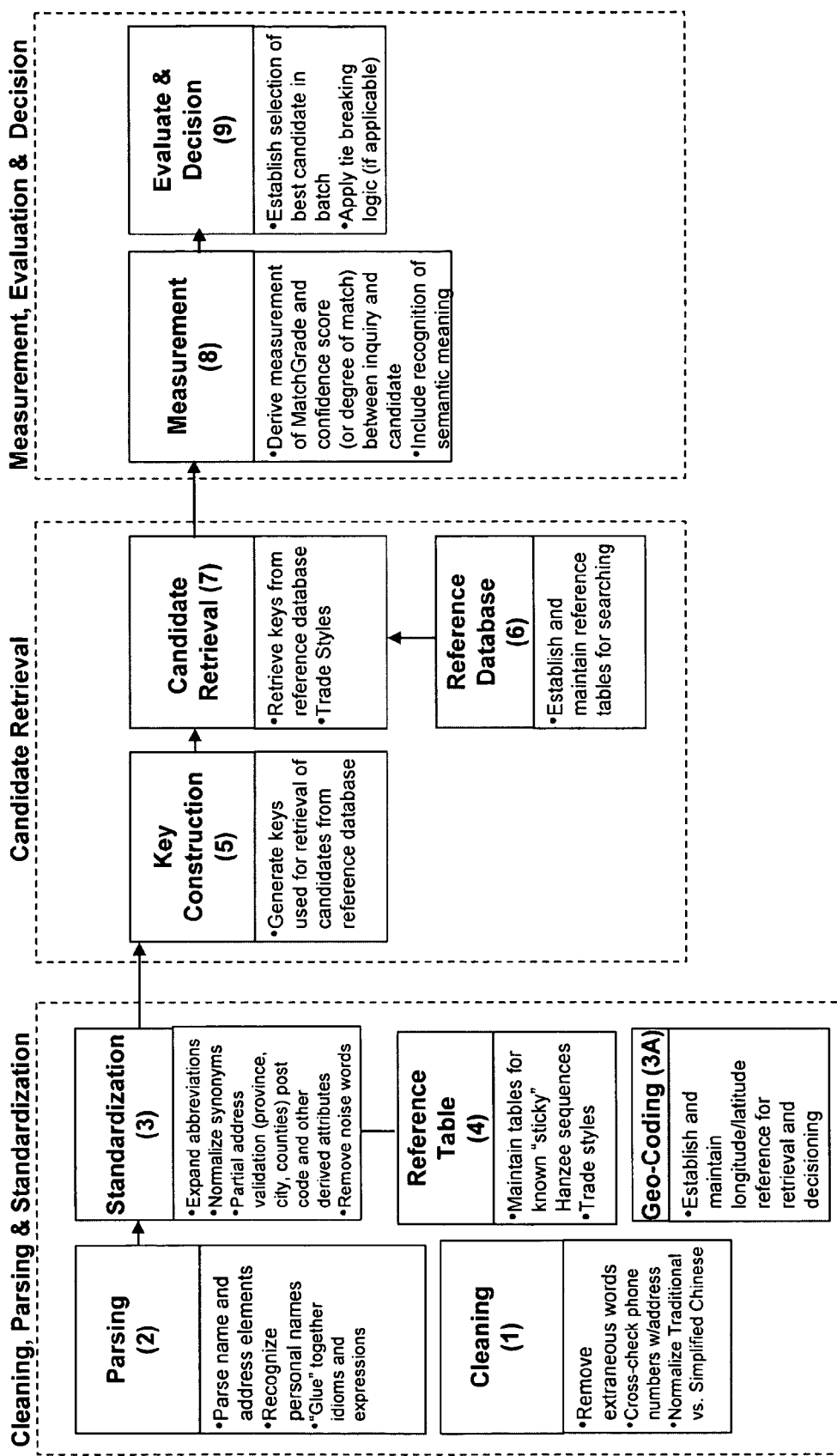
FIG. 4 is a block diagram showing the component processes of the prior art data matching method.
Figure 6:
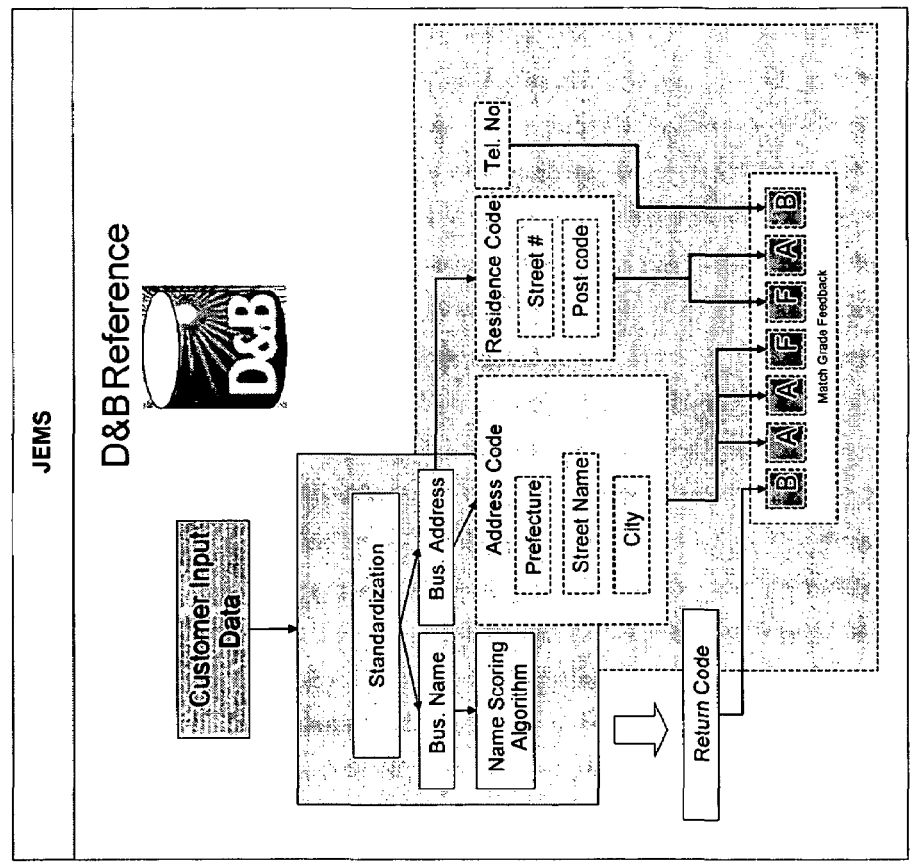
FIG. 6 is a block diagram of the enhanced matching system of the present disclosure.

The method performed by the enhanced matching system of the present disclosure is described below. A diagram of an embodiment of the system of the present disclosure is shown in FIG. 6. The new system may replace current data matching systems or act as an enhancement to the current character-based systems. The system is modular enough that it can be added to the current workflow process as a set of extra components and workflow stages.

Cleaning, Parsing and Standardization (CPS)

The enhanced matching system is utilized for an enhanced matching method, which begins with a first step of cleaning, parsing and standardization (CPS) of the inputted inquiry data.

In one embodiment, external software is used for cleansing, parsing and standardization (CPS) of the inputted search data. The output of that process is further enhanced to asses derived information, expand acronyms, and to account for other known usage challenges. This expansion uses certain methods adapted to Asian writing convention such as described in FIGS. 13, 14, 15, and 16.

The system includes various fields for entry of data either by a user searching for data or a user managing the system. A first set of fields includes a number of "Job Settings", which are set up so that a user can enter various data to govern processing of the search job. These various types of data may be presented as different fields in a "Job Preferences" user interface (UI). The Job Preference interface may include fields for the following:

(a) Processing Batch number: This would presumably be auto-generated, and just confirmed by user. The job number uniquely identifies the job and may also contain a customer ID (see below) as part of the number. The system also creates job batch numbers, and this could be used as an alternative.

(b) Customer ID: This is preferably a number to identify the customer. The customer ID may be retrieved via a lookup, and the system includes include a facility to create a new customer ID if no customer ID exists. This is preferably not full Customer Relationship Management (CRM), but just what is required to "tag" the data as it goes through the system.

(c) Autodecisioning threshold: This value is based on a preselected threshold confidence code for the job. The confidence code threshold, e.g., 1-10, at which the system can auto-match a DUNS identifier, i.e., a unique corporate identifier (assuming that processing and tie-breaking logic produces no duplicates). This capability is preferably in the Job Preferences Window.

(d) Inquiry/reference SQL (structured query language) Tables: In these tables, a user can specify the server(s), database(s) and table(s) that contain the inquiry data and/or reference data. In one embodiment, the external software creates a table for each job it processes, which will be the inquiry data table/s.

(e) Reports for Job: The Job Settings interface could also include the ability to specify in advance the reports desired and the location to write them to.

The system may also include a management interface to access data including a matchgrade pattern matrix, an example of which is shown in FIG. 7, by which matchgrade patterns & their mappings to confidence codes will be stored in a system database. The system can search and edit these via a basic graphical user interface (GUI). The management interface may also include access to stored tie-breaking rules, which are described below in more detail and which enable the selection of a final best-match from a group of similarly stratified potential results. The tie breaking rules are preferably modular, so that they are not merely "hard-coded" within the system program artefacts, thereby allowing for ongoing tuning. In one embodiment, each customer's tie-breaking rule set is stored on their individual file so that the user's tie breaking rules come up automatically as the default. In another embodiment, the UI can select tie-breaking rules for the Job, or the location, i.e., directory, of the rules. Preferably, the rules are stored in scripts or in another editable format so that rules can be enhanced, removed or added to without the need for a new release of the system.

A user may input various data identifying a desired entity to be search. The data representing the user's inquiry is referred to as inquiry data, which is stored in a record, referred to as an inquiry record. Such process inquiry data includes data inputted by a user representing information on the entity for which the user is attempting to locate a best match from the reference database. This data includes business name data, address data and telephone number data, all of which are processed in the cleansing, parsing and standardization (CPS) routines described above. Input can be in mixed character sets, including both Asian and Roman scripts. Address data is processed by the CPS routines to produce derived address codification, and then further divided for evaluation. Telephone Number data is standardized by the CPS routines to separate out subfields based on local country conventions.

Additional data may also be stored with the user-inputted data, including a Batch number stored with the incoming data so that job is uniquely identified throughout its existence in the system, and a Record Number which uniquely identifies each inquiry data record within the job. The record number could merely be a sequential number.

Processing of the user-inputted inquiry data produces a number of data elements and codes. The system utilizes algorithms to evaluate all in-scope data elements in a way that produces retrieval keys and evaluation attributes such as those specified below. Many of these algorithms are constructed in such a way as to enable simultaneous treatment of multiple scripts including both phonetic and ideogrammatic writing. The data elements, keys, and attributes are stored in a database for each inquiry record. The data elements may be provided in phonetic languages, or in non-phonetic or ideogrammatic languages or a combination thereof. The records include:

a) Cleansed Business Name (after CPS). This is the standardized name to which an algorithm is applied. In one example, an algorithm includes Return code Parsing, where the First byte of the return code is used for Business Name evaluation. Additional transformations include the expansion of acronyms and the treatment of known aliases, as well as treatment of observed Asian writing convention such as described in FIGS. 13, 14, 15, and 16.

b) Additional information can be inferred and appended, such as prefecture names in Japan.

c) Address codifications are inputted into the system or may be computed or retrieved from an external module. The system uses algorithms to derive or parse codifications to retrieve data including a Street number, Street name, city, Province (prefecture), and/or Postal code. For example, in Japan, a Residence Code includes numeric information of up to the actual street number, and identifies and removes the building floor and room numbers by picking up key words, such as bldg, building, floor, FL, room, RM, suite, etc., in their various manifestations in Japanese script across multiple writing systems.

Other codifications, such as longitude/latitude may also be performed by the system. Parsing of this codification may result in derivation of additional attributes.

d) Telephone area code is provided by direct input into the system and enriched via CPS processing. A custom algorithm is created to perform CPS and parse the inputted telephone number. The telephone number is parsed into a sub components where possible. It is then stored on the inquiry record.

Candidate Retrieval

After cleansing, parsing, and standardizing inquiry data, the system must retrieve a candidate list for evaluation. The objective is to construct a candidate list that is most likely to contain the best available match from the reference database while minimizing the pool of candidates to be considered and the computational complexity of retrieving that pool of candidates. Candidates must be the "best" candidates from the reference data, i.e. reference records having the most similarity with the inquiry record considering not only character similarity but tone, ideogrammatic content, and other aspects unique to Asian writing systems. In other words, the process should return a list of the most likely candidates, considering all available and inferred information.

Candidate retrieval normally relies on methods to distinguish records in the database that may be similar to the inquiry record. The algorithms used strike a balance between predictiveness, i.e., how likely is the algorithm to retrieve a set of records that contains the expected match, and performance, which is related to how many records are retrieved, the computational complexity of deriving retrieval keys, and therefore how quickly the candidate list can be processed.

Figure 8:
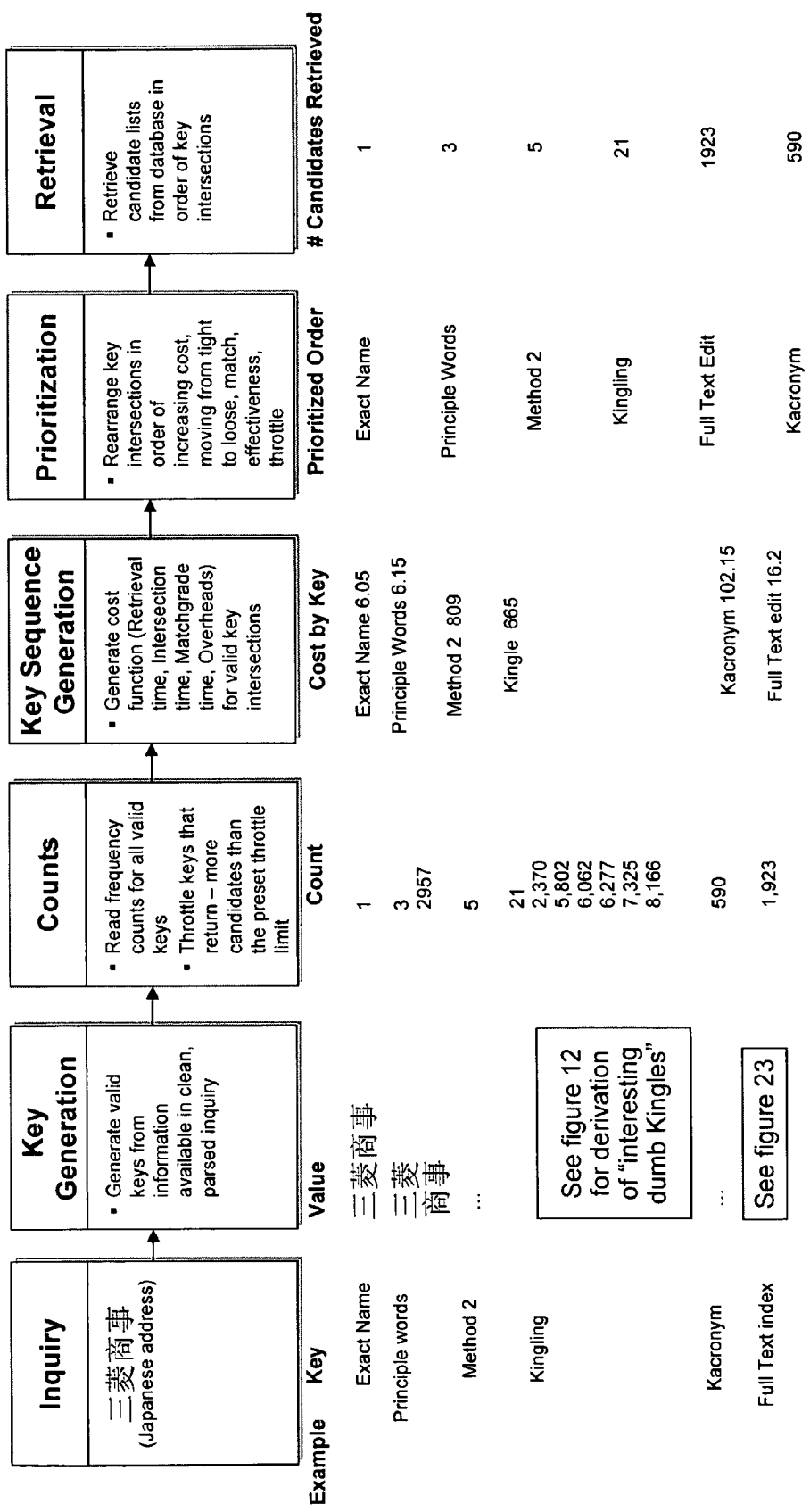
FIG. 8 is a block diagram showing a method for retrieving candidate lists.

To allow for the inclusion of ongoing refinements, there is provided a non-deterministic method of candidate retrieval that allows for the use of multiple algorithms and the selection of the best subset of those algorithms for each inquiry based on computational complexity, predictiveness of algorithms, and uniqueness of the anticipated set of retrieved candidates and observed or inferred aspects of candidate distribution unique to Asian data sets. Typical steps of this method, and an example, are shown in FIG. 8. The method includes generating valid keys, such as key words, Hanzee or Kanji acronyms (Hacronyms, Kacronyms) and telephone numbers, from information available in the inquiry data. Frequency counts for all valid key intersections, i.e., matching keys in the inquiry record and in a reference record, are retrieved from previously computed reference sets. Optionally, those keys that result in more candidates than a preset frequency limit are throttled or suppressed. Other techniques can also be applied to winnow the proposed retrieval queue. A cost function is generated for valid key intersections, based on one or more factors, such as retrieval time, intersection time, predictiveness, and computational overheads. The key intersections are rearranged in order of increasing cost, based on the product of computational complexity, predictiveness, and the number of potential candidates retrieved; candidate lists are retrieved from the database in the order of key intersection products accordingly. This method allows for optimization of the approach in real time as inquiries are processed.

Figure 9:
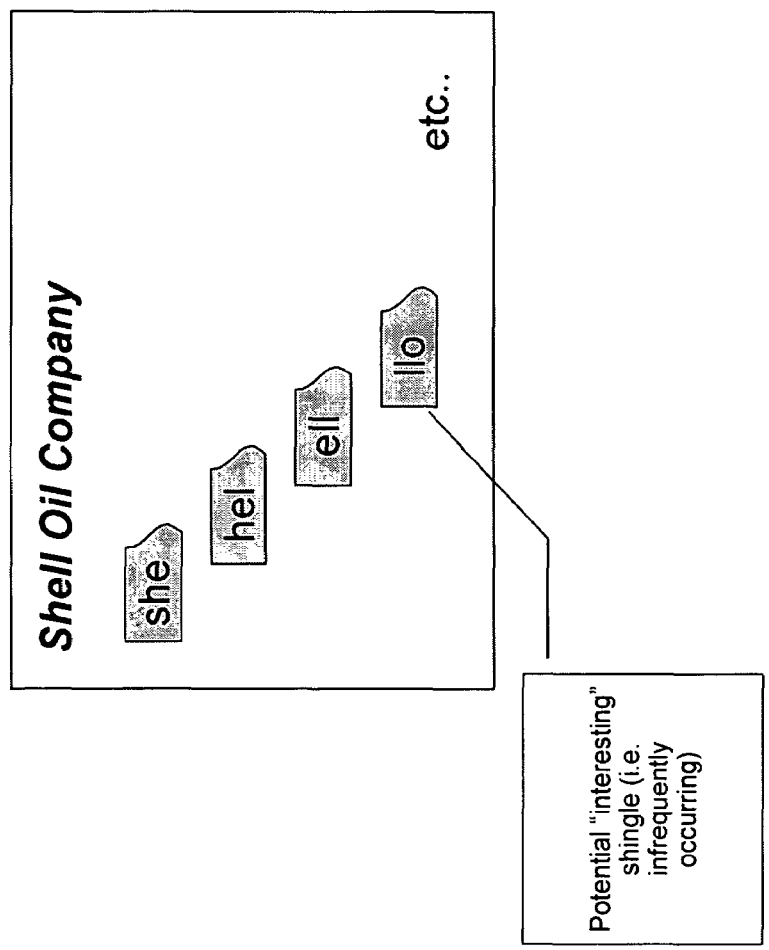
FIG. 9 is an illustration of examples of shingles derived from a company name in English.

In phonetic languages, one of the algorithms used to account for orthographic variation is a method known as "shingling," whereby orthographic fragments of known size and offset are selected by permutation from the inquiry string and compared against indices indicating how unique those same fragments are in known records in the database. Suitable keys are those fragments representing infrequently observed fragments. Examples of shingles of the name of "Shell Oil Company" are shown in FIG. 9. In implementation of shingling (for phonetic languages), shingling is employed when there can be identified "unique" shingles (i.e. less frequently-occurring shingles) that would be likely to be both predictive and efficient from a computational throughput standpoint.

The challenge in using shingling in non-phonetic languages is that symbolic variation has far more meaning. It is unlikely "misspellings" will occur in such languages, although there are certainly situations where characters are omitted and/or re-arranged while still preserving meaning. It is also possible that similar sounding symbols will be input due to the intricacies of Asian language input methods editors. A further challenge comes from the fact that certain symbols, when coupled with other symbols, take on a new meaning which is only represented by the combination of the characters—these combined complex groupings must be treated carefully so as not to disassociate them during algorithmic manipulation, otherwise embedded meaning is lost or changed.

The present disclosure provides a method of matching fragments of inquiry data by managing symbolic manipulation in a way that is appropriate to Asian languages. This method groups certain symbols together, as "sticky" shingles, which in the non-phonetic language have a higher meaning when grouped together. Additional inference is drawn from the resulting transition between and among observed sticky shingles (termed "Hingles" in Hanzee and "Kingles" in Kanji. FIGS. 10-12 show an embodiment of this method as applied to the Chinese language, although this method is useful in any non-phonetic language or communication system. Extrapolations are also applied to account for mixed writing systems (e.g., combined Kanji and Katakana in Japanese) in the same data attribute.

FIG. 9 is an example of "shingles". To address shingling in Hanzee, the Chinese writing system, the method utilizes "hingling", which is short for Hanzee-shingling. FIG. 10 is an example of Hanzee shingles, or hingles (these hingles are 2 characters long, and thus may be termed "Huples" (Hanzee Duples). Hingling preserves the concept of overlapping sub segments of search strings while considering certain Hanzee-shingles, or hingles to be "sticky" because they are grouped in order to convey some higher meaning. These "sticky hingles" are a hallmark of ideogrammatic writing that can be exploited to dramatically improve candidate retrieval. Hanzee characters are neither letters nor words either, but are semantic elements. As such, characters' meanings change radically when they "stick" together, as is shown in FIG. 11. Therefore, the set of characters representing "Shanghai", as shown in FIG. 11, would be marked as special, and kept together during certain manipulations. Observing the transitions from hingle to hingle (or huple to huple), the candidate retrieval method can deduce highly predictive sub-components of the input string.

Many "sticky hingles" are also "noisy hingles", which means that they occur so frequently that they are not useable for candidate retrieval. Technically speaking they are "uninteresting". Conversely, "interesting" hingles are those that occur infrequently, and thus are highly predictive for candidate retrieval.

In addition to hingling and sticky hingles, the present invention distinguishes "noisy hingles" or hingles that occur together so frequently that they are not useable for candidate retrieval, and are thus "uninteresting". The method also identifies and utilizes "dumb hingles", which are groups of ideograms observed to be adjacent in reference information, but which when inspected have no implied meaning. Occurrences of these "dumb hingles" have no semantic meaning, but are found to be strong predictors in candidate retrieval methodology. An example of a dumb hingle is provided in FIG. 12.

Thus, the method includes analyzing the database and sidelining all "noisy hingles" into a special file. These noisy hingles are not used for reference table building, and are ignored in inquiry inputs. This method is very predictive.

All of the above nomenclature and methodology can be extended to Kanji for Japanese writing. The resulting "kingles", "sticky-kingles", "dumb kingles", and interesting/uninteresting parings have similar functionality; however, since Japanese inquiry data also contains interspersed Katakana, Romanji, and Hiragana characters, the ideogrammatic algorithms must be enriched with prior phonetic methods to yield predictive results.

The method also includes analyzing additional aspects of names occurring in non-phonetic languages. In one embodiment, shown in FIG. 13, the system may abbreviate or ignore commonly occurring indicators, such as structural indicators. As shown in FIG. 13, the system recognizes structural indicators in the Hanzee name for "D&B Taiwan", which refers to the Taiwan branch of the D&B Corporation. In this example, the system removes or sidelines the hingle representing "American business", and abbreviates and/or sidelines the hingle representing "Taiwanese corporate structure". Thus, the uncommon combination of characters representing D&B is primarily used for matching purposes (along with any predictive dumb hingles). As shown in FIG. 14, other structural indicators within a name may be used for searching or sidelined, such as indications of divisions or departments within a company name. In another embodiment, exemplified in FIG. 15, "Hacronynms", i.e., Hanzee acronyms are isolated from a company name to reflect acronyms commonly used to describe a company, allowing the system to search and retrieve candidates having a given hacronym. The system may also reflect differences in simplified and traditional versions of a non-phonetic language, as is shown for example in FIG. 16. Finally, similar, but phonetically enhanced versions of the approach exists for Japanese Kanji acronyms, termed "Kacronyms" which can also be observed with embedded phonetic writing as noted above.

The system may also rank candidates by their matchgrade and confidence code. Preferably, the system first ranks candidates in order of their confidence codes and then further differentiates the highest ranking stratum based on business tiebreaking rules. Assignment of the matchgrade and confidence code and application of tiebreaking rules is described in further detail below.

There is also provided a process for use in evaluating the predictiveness of candidate retrieval algorithms, including hingling and other algorithms for the overall process. For a matching environment with non-deterministic candidate retrieval, the system picks the most useful algorithms for each inquiry record. Computational Complexity CC (A) of an algorithm (A) is the computational iterations: elemental input or the number of steps or arithmetic operations requires solving a computational problem. Predictiveness P (A) is equal to the number of expected outcomes divided by the number of observed outcomes. The expected yield Y (A) is equal to the # of records returned if the method were employed. The process first includes calculating each algorithm's Algorithmic Constant (AC(A)) based on the following formula: $AC(A_n)=CC(A_n) \times P(A_n)$. The algorithmic constant is then multiplied by the expected yield to produce the final score X (A): $AC(A_n) \times Y(A_n) = X(A_n)$. Examples of these calculations are shown in FIG. 17. The algorithms yielding the lowest final score are preferably used in the matching system.

Evaluation and Decisioning

Figure 18:
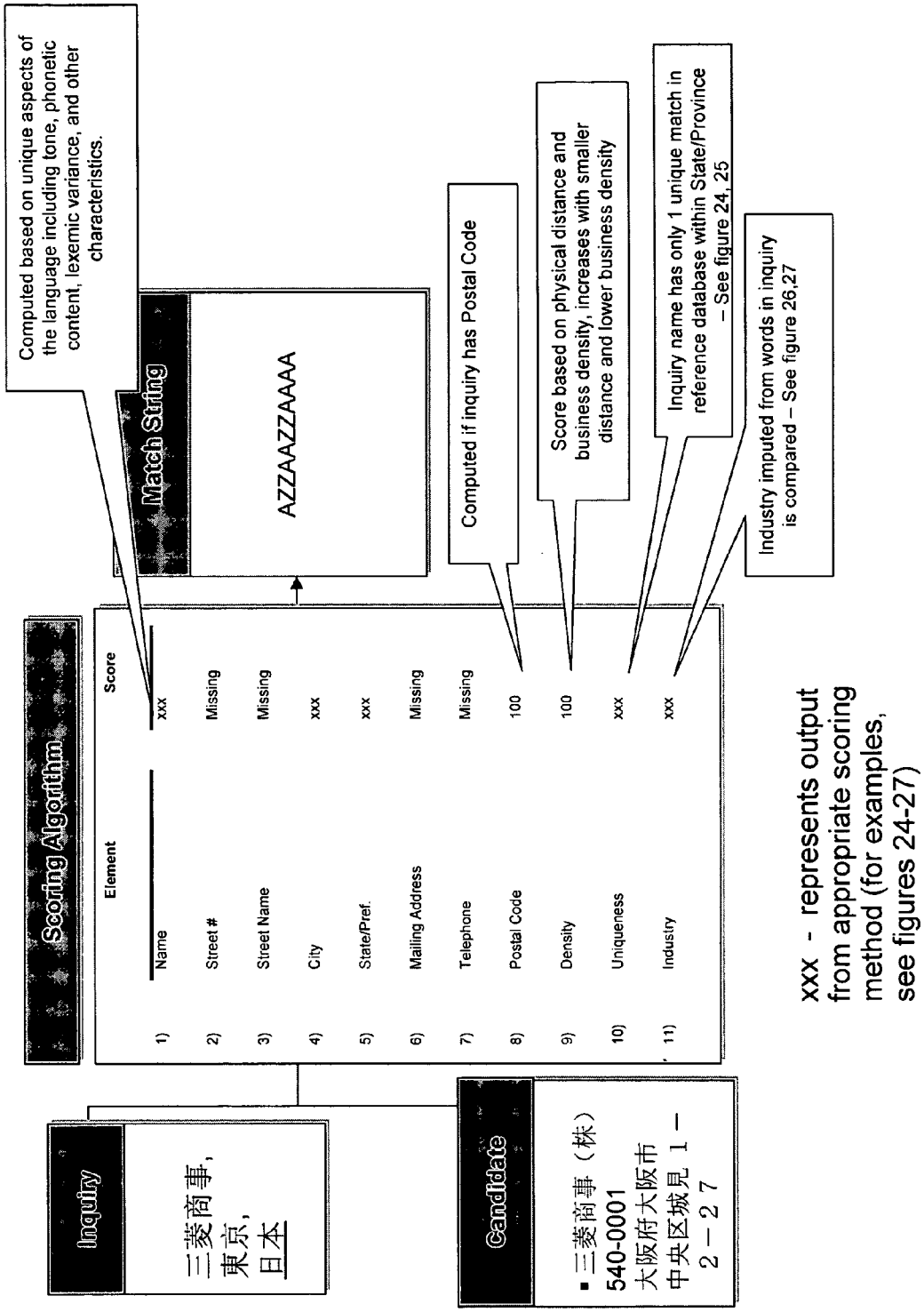
FIG. 18 is a block diagram of a method of assigning a matchgrade string to a record, according to the method of the present disclosure.

After the appropriate candidates retrieval methods are selected and employed, the candidates are then scored by computing matchgrade ("MG") strings. For each element of a matchgrade string, corresponding attributes of input and candidate data are assigned a code for of A, B, F, or Z. This process is shown in FIG. 18. The result of assigning MG codes to each code component is a matchgrade string, or matchgrade pattern, shown in FIG. 19. In one embodiment, there are up to 11 entries (bytes) in a matchgrade pattern.

Matchgrade codes include an "A" match, indicating that the inquiry subject data element can be treated as "the same" as the reference data, and a "B" match, indicating that the inquiry subject data element is "similar" to the reference data, but not the same. These codes also include an "F" match, indicating that the inquiry subject data element is different from the reference data, and a "Z" match, indicating that the inquiry subject data element is absent in either the inquiry record or the reference data record.

Examples of various matchgrade codes are illustrated in the table of FIG. 20, showing matchgrade codes for reference results as compared to inquiry data for the example of "Mitsubishi Trading Corp vs. Mitsubishi Trading". In order to establish the inference of A/B/F for Asian languages, scoring methods consider not only character-by-character comparisons, but also tone (for Chinese), Pinyin or Kana transliteration, lexemic variation, stroke complexity, and other parameters unique to ideogrammatic writing systems.

Figure 25:
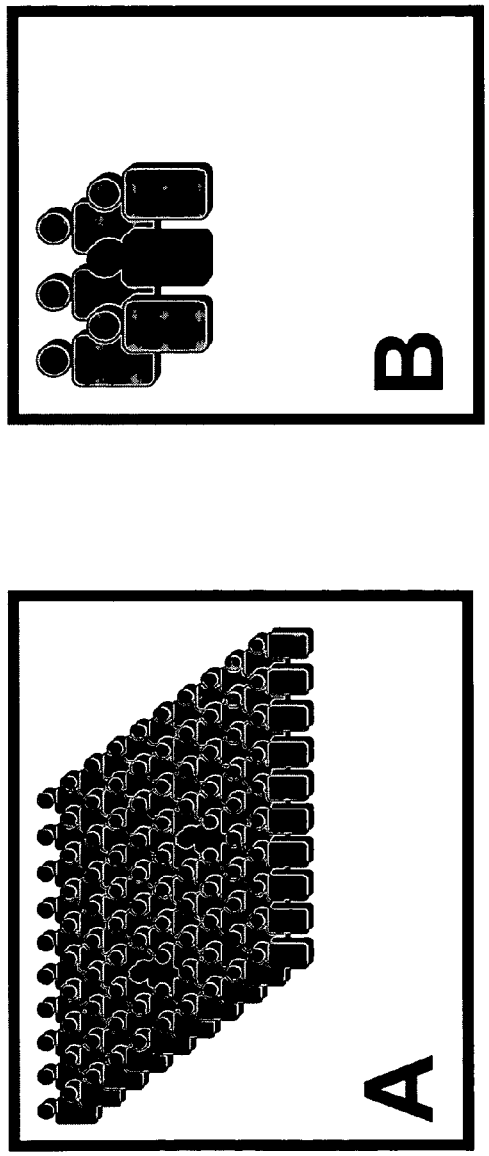
FIG. 25 illustrates relative versus absolute uniqueness, according to the method of the present disclosure.

Certain proprietary algorithms have been developed to account for nuances in Asian writing systems and local convention. For example, Uniqueness (one of the 11 matchgrade elements) must take into account inter-relationships between very large cities found in Asia and the structure of Prefectures in Japan and Provinces in China (FIGS. 24 and 25). Relative vs. Absolute uniqueness has been introduced to accommodate these observed traits of Asian business demographics.

Another matchgrade element which requires special treatment for Asian languages is Industry classification, which must be inferred through a new process, termed Polylogogrammatic Semantic Disambiguation (FIG. 26-27). This process employs methods of recursive reduction of the inquiry string, taking into account the fact that Asian inquiries (especially in Japan) often include a combination of both ideogrammatic and phonetic writing systems. This recursive reduction is accomplished in such a way as to highlight the most likely industry-related keyword for subclassification within the matchgrade string.

Figure 21:
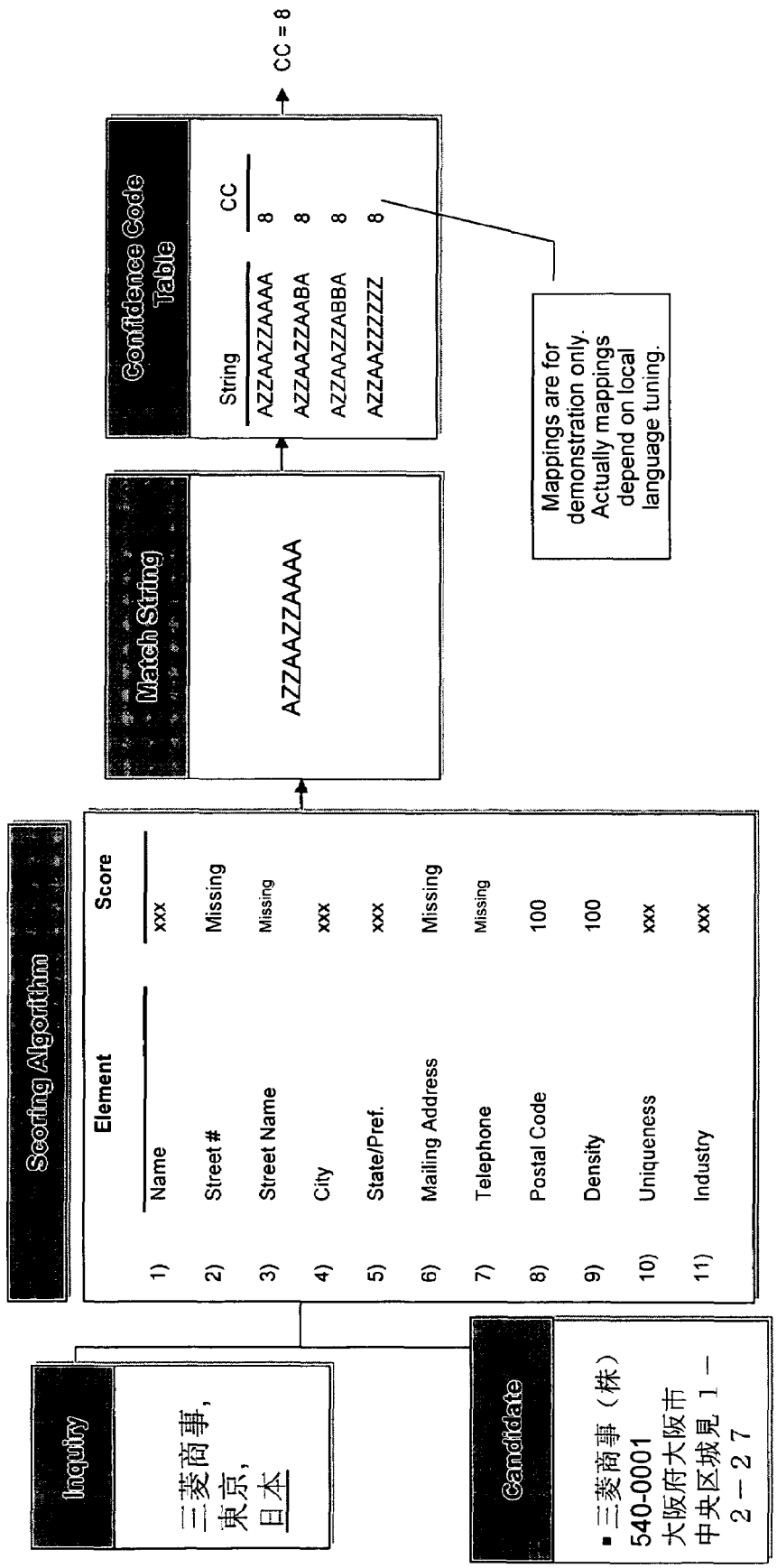
FIG. 21 is a table showing confidence codes assigned to reference record match candidates, according to the method of the present disclosure.

After derivation of the matchgrade sting, a confidence code ("CC") is then assigned to the reference or retrieved data record based on the derived matchgrade string, as is shown in FIG. 21. In one embodiment, the confidence code is a number, preferably an integer, between 1 and 10. This assignment is intended for the stratification of data into groups to enable application of business rules. Preferably, the CC is retrieved from a pattern matrix such as is shown in FIG. 7. The MG pattern matrix is preferably stored in an SQL table, with each element in a separate field.

In the system's performance of evaluation and decisioning steps, tie-breaking rules must be used if more than one candidate is retrieved that has the highest confidence code of all match candidates retrieved for a given inquiry entity. Confidence codes together with the tie breaking rules may be used to auto-decision as per job settings and business rules in autodecisioning, a match is automatically accepted if a best candidate can be identified, and if the candidate has at least a threshold confidence code to warrant a business application. The threshold confidence code may be pre-selected by a user. If tie-breaking rules are used, the system will record which rule was used to break the final tie for any inquiry record, and what data values were for that final comparison.

An example of a set of tiebreaking rules is described below. The rules are processed in order until there is one candidate out-ranking all others. Ranks are represented as integers, and a higher rank corresponds to a lower integer value. Only the highest-ranked candidates (if there is more than 1) proceed to the next rule.

Rule 1—"A" Match: Business Name, Street #, Street Name, City, Province/Prefecture and Postal Code MG patterns are all "A" and Company Type is the same. 0—Yes, 1—No Rule 2—matchgrade on Business Name: Rank candidates according to matchgrade code on business name. 0—A, 1—B, 2—F Rule 3—Company Type: Rank candidates according to company type (per code) compared to Inquiry data. 0—Same, 1—Different Rule 4—matchgrade on Province/Prefecture: Rank candidates according to MG Code on state. 0—A, 1—F, 3—Z Rule 5—matchgrade on City: Rank candidates according to matchgrade code on city. 0—A, 1—F, 2—Z Rule 6—matchgrade on Street Name: Rank candidates according to matchgrade code on street name. 0—A, 1—B, 2—F Rule 7—matchgrade on Street Number: Rank candidates according to matchgrade code on street number. 0—A, 1—B, 2—Z, 3—F Rule 8—OOB (Out of business) Indicator: Rank candidates according to whether status is trading or not (OOB): 0=Active, 1=Inactive (OOB)

Rule 9—HQ/BR (Headquarters/Branch) Status. Rank candidates according to entity type: 0=HQ, 1=single location, 2=branch, 3=subsidiary.

Rule 10—"A" matchgrade on Phone Number. Rank candidates according to "A" matchgrade code on telephone number: 0—A, 1—all others Rule 11—"Company Type" Position in Company Name. Rank candidates according to "company type" position indicator (per code) compared to inquiry data: 0—Same, 1—Different.

Rule 12—matchgrade on Phone Number. Rank candidates according to matchgrade code on telephone number: 0—A, 1—B, 2—Z, 3—F Rule 13—matchgrade on Postcode. Rank candidates according to matchgrade code on postcode: 0—A, 1—B, 2—Z, 3—F Rule 14—TSR (trade style record) Code. Rank candidates according to presence/absence of TSR code: 0—TSR code present, 1—TSR code absent.

Rule 15—Present Data Flag. Rank candidates according to value of "COM" flag: 0—Flag is absent (updated data), 1—Flag is present (old data)

Rule 16—Record update date. Rank candidates, newest to oldest, according to the date of a major update in a system database.

Rule 17—DUNS Number. This is the ultimate tie breaker. Rank candidates by DUNS number, i.e., unique corporate identifier, in ascending order.

matchgrade results are then presented to the user. Information presented may include one or more of the following: the matchgrade pattern used (one field per element), confidence code, Match Data Profile, processing date, processing batch number, customer ID, DUNS number of matched reference record, inquiry record number, and the last tie breaking rule used. The results may be categorized based on differing confidence codes and other observed or inferred attributes.

Additional capabilities may be provided to the user to browse and review data that could not be matched. There may also be ability for the user to browse any data, including auto-matched data. Other capabilities may include filtering (by confidence code, matchgrade pattern, tie-breaking rules used) of output, manual matching, and re-matching. The system may also include the capability for manual initiation ability for re-processing of selected record/s, by which the system re-runs the full process for the selected records in response to a user request.

Figure 22:
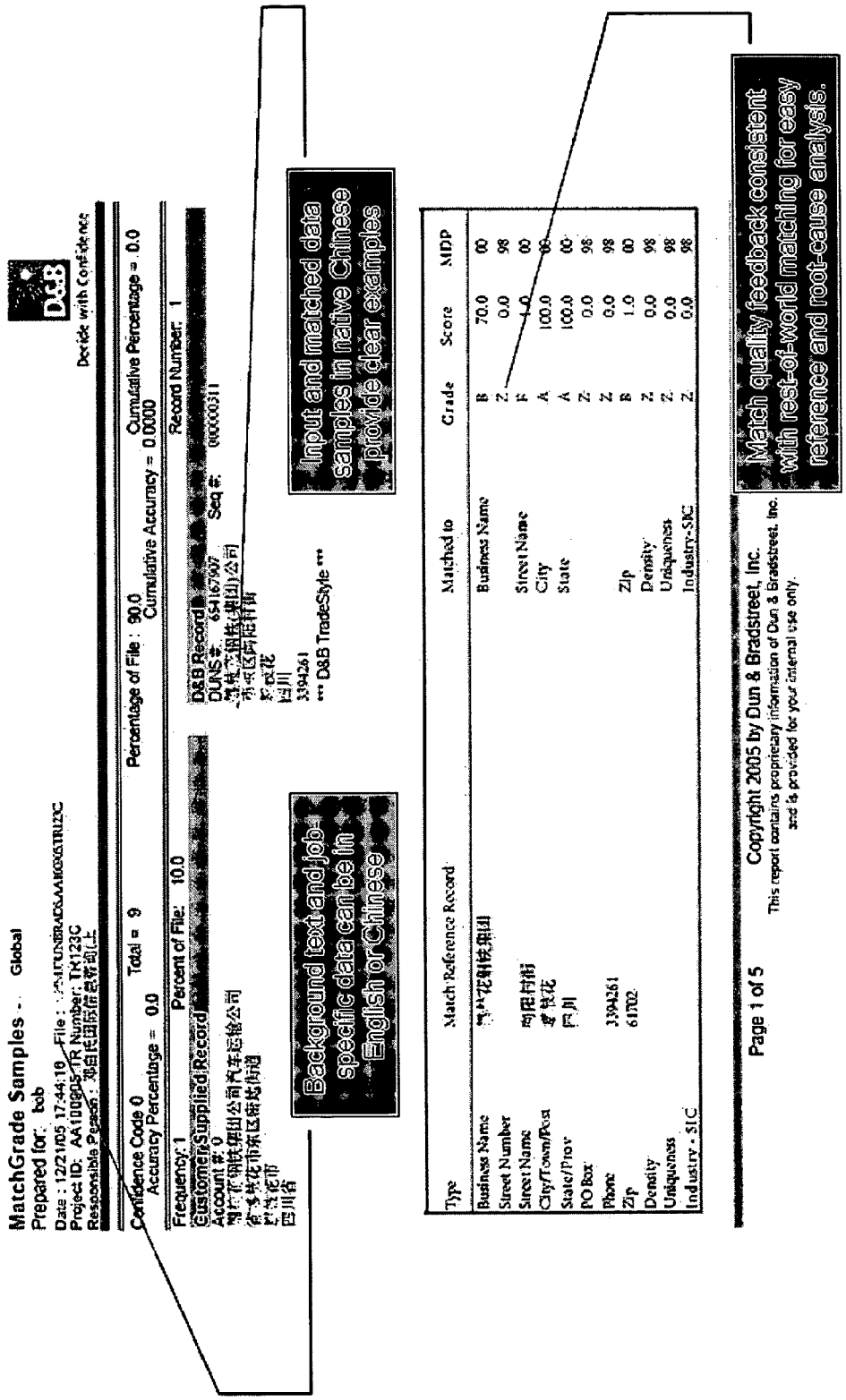
FIG. 22 is an example of a matchgrade Feedback Report showing how the results of the match are presented, according to the method of the present disclosure.

Preferably, the results are presented to the user as a report. Preferably, the results are in the form of a non-editable report from results data as shown in FIG. 22. In another embodiment, it is be possible to add, modify and/or delete reports without re-compiling the system. Reports could be coded in XML/XSL and generated initially as HTML, then converted to non-editable format. The applicable reports can be chosen in advance for a job, which then become the default set for that job. Reports can be generated with English or native language substrate text.

The system stores a matrix of the current matchgrade patterns and their corresponding confidence codes in a "matchgrade Master Table". There is only one row per unique matchgrade pattern, as shown in FIG. 7. This table may include: matchgrade patterns as a string, the confidence code attached to that pattern, each byte of the preferably 11 matchgrade patterns as a separate column, the version for the last change to each entry, and/or the update date-time which is auto-generated when the entry is changed. Preserving edit history allows for ongoing quality assurance and continuous process improvement.

Whenever an entry in the matchgrade Master table is changed for any reason, e.g., the confidence code is changed or validated; the system preferably stores the previous entry in a "matchgrade History Table". This table has an identical structure to the matchgrade Master Table, except that there is be multiple entries for each matchgrade pattern.

Every change to the matchgrade Master table requires incrementing of the latest version number. This will either be a "minor" change (e.g. 0.2>>0.3) or a "major" change (0.3>>0.4). Each entry in the matchgrade Master table affected by this change will be stamped with the latest version. It will, however, be possible to increment a version and enter a comment without making any change to the matchgrade data.

Information about these changes can be stored in a "matchgrade Version Table", which may include: Version number, which is the number of the new version, User ID of the person who made the change, comment and/or date. The comment is the description of the change made, and why. This field must be populated before any change is processed. Update Date is the auto-generated date/time field marking when the change was entered.

In one embodiment, the method further includes comparing strings of non-phonetic characters, such as Simplified Chinese, Traditional Chinese, or Japanese characters, and generating a numeric score representing how similar they are. This ancillary information can be used to establish attribute—level matchgrade assignments and for imputation of dumb shingles, sticky duples, and other constructs. The method and library discussed below apply in one embodiment to Hanzee characters, but may also apply to any non-phonetic language or communication system.

The similarity computation is done on several axes, including Orthographic, Phonetic and Lexemic variations, as well as through multi-user blind tests to the objectively evaluate native speaker reaction to the algorithmic inference.

In addition to the scoring described above, additional aspects of ideogrammatic writing, for example in both Japanese and Chinese, are exploited in the evaluation and decisioning process. Preferably, the hingling process described above is also used determining a confidence code or other score representing the quality of a match.

The enhanced matching system and method of the present invention provides superior data matching and more detailed feedback for Chinese, Japanese and other non-phonetic or ideogrammatic language data matching systems. The system is able to use more data elements for data cleansing and matching, is able to match data in more ways than was possible with the prior art, and can provide more intelligent and granular feedback on the matching process. This granular feedback enables automation of a business process via a computer system that was otherwise not possible.

The enhanced matching system of the presented invention, such as a Japanese Enhanced Matching System (JEMS), matches data using more of the data elements in the Customer Input file than previous systems and in ways that exploit the ideogrammatic nature of Asian writing systems. The system and method also feature additional comparison schemes for existing and new data elements, as compared to prior art systems.

It should be understood that various alternatives, combinations and modifications of the teachings described herein could be devised by those skilled in the art. The present invention is intended to embrace all such alternatives, modifications and variances that fall within the scope of the teachings described herein.

The invention claimed is:

1. A computerized method of searching and matching input data to stored data storing in the memory, the method comprising:

receiving the input data comprising a search string having a plurality of elements, at least some of the elements forming part of an ideogrammatic writing system;

converting a subset of the plurality of elements to a set of terms using at least one method selected from the group consisting of polylogogrammatic semantic disambiguation, hanzee acronym expansion, kanji acronym expansion, and business word recognition;

wherein the converting step comprises normalizing traditional and simple versions of the ideogrammatic writing system;

generating a plurality of keys from the set of terms;

determining from the stored data (a) optimization of said plurality of keys, thus yielding optimized keys, and (b) candidates that share a commonality with said optimized keys, thus yielding key intersections and a quantity for said key intersections; generating a cost function for said key intersections;

prioritizing said key intersections according to said cost function, thus yielding cost-prioritized key intersections;

retrieving match candidates in order of said cost-prioritized key intersections, and bounded by a pre-determined threshold and said quantity;

wherein the retrieving step further comprises generating a matchgrade, a confidence code, and a match data profile for each match candidate based on a degree of match; and selecting a best match from the match candidates.

2. The method of claim 1, wherein the determining step uses at least one method selected from the group consisting of sticky hanzee shingling, sticky kanji shingling, dumb hanzee shingling, dumb kanji shingling, and text indexing across a plurality of writing systems.

3. The method of claim 1, wherein the converting step comprises dividing the search string into a plurality of overlapping sub-segments.

4. The method of claim 3, wherein the converting step further comprises identifying sticky sub-segments comprising sub-segments having semantic meaning in the ideogrammatic writing system.

5. The method of claim 4, wherein the converting step further comprises removing noisy sub-segments.

6. The method of claim 5, wherein the converting step further comprises:

identifying dumb sub-segments comprising adjacent elements having no semantic meaning in the ideogrammatic writing system; and imputing predictiveness from the dumb sub-segments.

7. The method of claim 6, wherein the determining step comprises using the sticky sub-segments and dumb sub-segments to generate the optimized keys.

8. The method of claim 1, wherein the ideogrammatic writing system is at least one selected from the group consisting of: Japanese Kanji, Chinese Traditional, and Chinese Simplified (Hanzee).

9. The method of claim 1, wherein the elements comprise Asian and Roman characters.

10. The method of claim 1, wherein the converting step comprises:
- parsing said plurality of elements to identify said set of terms, including name elements, phone number elements, and address elements;
- inferring business line through polylogogrammatic methods, cross-checking phone number elements with the address elements; and
- recognizing idioms and expressions of the ideogrammatic writing system and keeping the idioms and expressions together to maintain meaning.

11. The method of claim 10, wherein the converting step further comprises identifying structural indicators and acronyms within a name element.

12. The method of claim 10, further comprising establishing longitude and latitude information based on the address elements and through inference of flexible Asian addressing conventions.

13. The method of claim 1, wherein the confidence code is determined at least in part based on the semantic meaning and inferred content of the search string.

14. The method of claim 1, further comprising providing an ordered list of selected match candidates based on said confidence code.

15. The method of claim 14, further comprising assigning each of the candidates in the ordered list to one of a plurality of match levels.

16. The method of claim 15, further comprising determining the assignment of match level by ranking the match candidates in order of their confidence codes and then further differentiating the highest ranking levels based on user-defined tie-breaking rules.

* * * * *